(12) United States Patent
Elkin et al.

(10) Patent No.: US 9,718,705 B2
(45) Date of Patent: Aug. 1, 2017

(54) UV LIGHT SOURCE HAVING COMBINED IONIZATION AND FORMATION OF EXCIMERS

(71) Applicant: Fraunhofer-Gesellschaft zur Förderung der angewandten Forschung e.V., München (DE)

(72) Inventors: Bentsian Elkin, Filderstadt (DE); Alexander Lohner, Stuttgart (DE); Siegfried Egner, Adelsheim (DE)

(73) Assignees: Fraunhofer-Gesellschaft zur Förderung der angewandten Forschung e.V., München (DE); SICO Technology GmbH, Bad Bleiberg (AT)

( * ) Notice: Subject to any disclaimer, the term of this patent is extended or adjusted under 35 U.S.C. 154(b) by 61 days.

(21) Appl. No.: 14/436,884

(22) PCT Filed: Oct. 18, 2013

(86) PCT No.: PCT/EP2013/071880
§ 371 (c)(1),
(2) Date: Apr. 18, 2015

(87) PCT Pub. No.: WO2014/060592
PCT Pub. Date: Apr. 24, 2014

(65) Prior Publication Data
US 2015/0274548 A1    Oct. 1, 2015

(30) Foreign Application Priority Data
Oct. 19, 2012    (DE) .................... 10 2012 219 064

(51) Int. Cl.
*C02F 1/32*    (2006.01)
*H01J 61/94*    (2006.01)
(Continued)

(52) U.S. Cl.
CPC .............. *C02F 1/325* (2013.01); *H01J 61/16* (2013.01); *H01J 61/20* (2013.01); *H01J 61/94* (2013.01);
(Continued)

(58) Field of Classification Search
None
See application file for complete search history.

(56) References Cited

U.S. PATENT DOCUMENTS

| | | |
|---|---|---|
| 4,255,663 A | 3/1981 | Lewis |
| 5,013,959 A | 5/1991 | Kogelschatz |

(Continued)

FOREIGN PATENT DOCUMENTS

| | | |
|---|---|---|
| DE | 33 20 597 A1 | 12/1984 |
| DE | 44 30 300 C1 | 12/1995 |

(Continued)

*Primary Examiner* — Douglas W Owens
*Assistant Examiner* — Srinivas Sathiraju
(74) *Attorney, Agent, or Firm* — Gudrun E. Huckett

(57) ABSTRACT

The invention relates to a device for producing UV light. Said device provides light from light sources that operate in accordance with different physical principles. The device comprises a chamber having several gas-filled plasma chambers (11, 12), wherein the chamber has at least one area (37, 39) transparent to UV light and/or VUV light. A first group (11) of plasma chambers is filled with an ionizable gas containing mercury and a second group (12) of plasma chambers is filled with a gas that forms excimers when suitably excited.

23 Claims, 10 Drawing Sheets

(51) Int. Cl.
*H01J 65/04* (2006.01)
*H01J 61/16* (2006.01)
*H01J 61/20* (2006.01)

(52) U.S. Cl.
CPC ............ *H01J 65/04* (2013.01); *H01J 65/042* (2013.01); *C02F 2201/3221* (2013.01); *C02F 2201/3227* (2013.01); *C02F 2201/3228* (2013.01); *C02F 2303/04* (2013.01)

(56) References Cited

U.S. PATENT DOCUMENTS

| | | | |
|---|---|---|---|
| 5,214,344 A | 5/1993 | Kogelschatz | |
| 6,193,894 B1 | 2/2001 | Hollander | |
| 6,699,698 B1 * | 3/2004 | Vitzthum | C12N 15/1006 435/173.6 |
| 6,856,093 B2 * | 2/2005 | Little | H01Q 13/22 118/723 MW |
| 7,863,590 B2 * | 1/2011 | Briggs | A61L 9/20 250/365 |
| 8,269,190 B2 * | 9/2012 | Dornblaser | A61L 2/10 250/453.11 |
| 8,357,330 B1 * | 1/2013 | Erdlen | A61L 2/10 250/455.11 |
| 8,378,323 B1 * | 2/2013 | Spann | A61L 2/10 250/455.11 |
| 9,168,320 B1 * | 10/2015 | Wedding | A61L 2/10 |
| 2005/0264215 A1 * | 12/2005 | Briggs | C02F 1/325 315/39.51 |
| 2006/0097657 A1 * | 5/2006 | Kogure | H01J 61/54 315/248 |
| 2008/0044592 A1 * | 2/2008 | Elkin | B05D 1/62 427/569 |
| 2009/0039757 A1 * | 2/2009 | Ohshima | H01J 65/046 313/484 |
| 2012/0086324 A1 * | 4/2012 | Voronov | H01J 61/30 313/113 |

FOREIGN PATENT DOCUMENTS

| | | | |
|---|---|---|---|
| DE | 10 2006 022 970 B3 | 11/2007 | |
| DE | WO 2007131563 A1 * | 11/2007 | ............ C02F 1/325 |
| DE | 10 2009 025 667 A1 | 12/2010 | |
| EP | 0 385 205 A1 | 9/1990 | |
| EP | 0 458 140 A1 | 11/1991 | |
| GB | EP 0772226 A2 * | 5/1997 | ............ A23C 3/07 |
| JP | EP 1100113 A2 * | 5/2001 | ............ H01J 65/04 |
| JP | 2010 218729 A | 9/2010 | |

* cited by examiner

UV LIGHT SOURCE HAVING COMBINED IONIZATION AND FORMATION OF EXCIMERS

BACKGROUND OF THE INVENTION

Prior Art

The generation of UV light and VUV light by excitation of gases or gas mixtures with high-frequency electric waves, in particular microwaves, is disclosed, for example, in DE 10 2006 022 970 B3. This UV radiator is of a very simple configuration and very reliable.

DE 10 2009 025 667 A1 discloses a low-pressure mercury lamp.

EP 0 458 140 A1 discloses an excimer radiator that emits UV light and/or VUV light.

The lamp that is disclosed in DE 10 2009 025 667 A1 operates similar to a tubular fluorescent lamp that is filled with gas. By a suitable excitation (e.g. by energy-rich electrons) of the molecules of this gas one or several electrons of the molecules contained in the gas are moved to an energy-rich electron orbital. As soon as these electrons return again to their original electron orbital, energy is released which is emitted in the form of light, in particular UV light.

These conventional discharge lamps are well known and have been proven successful in practice. A special advantage of such ionization radiators with a gas that contains mercury or compounds thereof is to be seen in that a large proportion of the emitted light has a wavelength of approximately 254 nm and that this light is very effectively produced, i.e, with a high efficiency.

This light at a wavelength of 254 nm has a disinfecting action. It is presumed that this light damages or even destroys the DNA of the microbes that are contaminating, for example, wastewater or drinking water. However, it has been reported in the literature that the microbes treated in this way recuperate relatively quickly.

An excimer radiator, as disclosed, for example, in EP 0 458 140 A1, operates according to a different physical principle.

According to the Internet encyclopedia Wikipedia, an excimer (short for excited dimer) is a short-lived particle that consists of two or more bonded atoms. The special feature compared to a molecule resides in that the excimer can be formed only when one of the binding partners is in an excited state. When this particle loses energy, the binding partners separate and return into their ground state. In the ground state, the aforementioned binding partners have a repelling action on each other.

The excimer radiator which is used in the device according to the invention emits light at a wavelength that is specific for the filled-in gas or gas mixture.

The invention has the object to provide a device for generating UV light that is of a simple configuration and which enables a very effective and potent eradication of germs, for example, in wastewater.

SUMMARY OF THE INVENTION

This object is solved in a device for generating UV light of the aforementioned kind in that a first group of plasma chambers is filled with a mercury-containing ionizable gas and in that a second group of plasma chambers is filled with a gas that upon suitable excitation forms excimers.

With the device according to the invention, UV light is thus emitted at different wavelengths.

The light which is generated by the mercury-containing gas or gas mixture in the first group of plasma chambers has a wavelength of approximately 254 nm and can be generated at a very high efficiency of approximately 40%. Also, the disinfecting action is very good because this UV light at least attacks, if not even destroys, the DNA of the microbes.

The UV light of the second group of plasma chambers has a shorter wavelength than the afore described UV light and is thus more energy-rich. It is presumed that therefore the organic mass of the microbial cell is attacked. This is a lasting damage of the microbial cell and effects therefore also a lasting disinfection.

With this combined attack on the DNA of the microbes, on the one hand, and the oxidation of the organic mass of the microbes, on the other hand, a very effective and long-lasting disinfecting action is achieved. In this context, the two "attacks" will mutually reinforce each other so that the disinfecting action is better than using UV radiation of only one light source.

Because both lamp types are combined in a common device, the apparatus expenditure is also lower; some components can therefore be doubly utilized. For example, the microwave generators can excite the gases contained in the two groups of plasma chambers to an electrical discharge. This causes as a whole reduced manufacturing and operating costs and increases the efficiency.

The excitation of the first group of plasma chambers can be realized by electrodes, by an inductive coupling and/or microwaves. In the second group of plasma chambers, the gas fill can generate excitation by means of an dielectric barrier discharge (DBD), a capacitive discharge, an inductive coupling and/or microwaves.

Basically, it is also possible to excite the gases or gas mixtures contained in the first group and the second group of plasma chambers mixtures in different ways in order to produce UV light. Therefore, in accordance with the boundary conditions of the field of application, one can select from the aforementioned possibilities.

A very effective and efficient kind of injecting the microwaves into the plasma chambers resides in that the microwaves are injected as surface-sustained waves, for example, into an exterior wall or another wall of the plasma chambers (Engl: surface-wave-sustained plasma). Then, the electromagnetic wave is propagated along the boundary of the media with different refractive coefficients. In this case, one of the media is the wall, the other the plasma, and the third medium optionally the exterior air. The electrical field of the microwave radiation penetrates to a certain depth into the plasma gas (so-called evanescent wave) and excites therein an electrical charge and, as a result thereof, plasma formation.

It is possible to arrange the magnetron for generating microwaves outside or inside of the chamber. When the magnetron is arranged outside of the chamber, then the chamber in general has an opening through which the microwaves pass into the chamber. Alternatively, the gases contained in the plasma chambers can also be excited by surface-sustained waves.

However, it is possible without problem to provide outside of the chamber electrodes for a dielectric barrier discharge (DBD) and/or a capacitive discharge or coils for inductive coupling (ICP).

Since the lamp efficiency of the first group of plasma chambers increases with increasing temperature and the wastewater to be disinfected has usually temperatures of less than 20° C., it is provided in a further embodiment according to the invention that between a plate of the chamber and the first group of plasma chambers a thermal insulation is provided. This thermal insulation can be realized, for example, by the gas that is contained in the device when the plasma chambers of the first group are arranged at a certain spacing relative to the plate.

For further improvement of the thermal insulation, it is however also possible to arranged between the plate and the plasma chamber or chambers of the first group a thermal insulation, transparent for UV light, in the form of a chamber that, for example, is under vacuum or filled with nitrogen. This additional chamber serves as a thermal insulation transparent for UV light.

In the second group of plasma chambers in which excimers are formed by excitation, it is desirable to utilize the cooling action of the wastewater to be disinfected because the efficiency decreases with increasing temperature. Therefore, it is advantageous when the plasma chambers of the second group are in direct and well heat-conducting contact with the plate of the device according to the invention.

It is also possible to arrange the plasma chambers of the second group between the plate and the plasma chambers of the first group. The plasma chambers of the second group then serve essentially as thermal insulation for the plasma chambers of the first group.

The device according to the invention can be embodied as a rectangular structure with one or two flat plates. However, it is also possible to arrange all components like a cylinder concentrically about a center axis. Then, the interior of this annular circle arrangement is usually flowed through by the wastewater to be disinfected and the plate is a (cylindrical) tube of glass through which the wastewater to be purified flows. The plasma chambers in the form of annular chambers are then arranged concentric about this tubular plate.

By means of the UV light of different wavelength emitted by the device according to the invention, different photochemical and photo-physical processes can be excited such that these processes occur uniformly and at high reaction rate. For example, the disinfection of drinking water and wastewater, of exhaust gases and of solid materials, for example, foods, is particularly effective because the bacteria are attacked with two different modes of action.

Further advantageous embodiments of the invention can be taken from the dependent claims. In other respects, with regard to the constructive configuration of the device reference is being had to DE 10 2006 and thereby its contents is entirely incorporated into the disclosure of the present invention.

The device according to the invention can also be mounted in a channel so that medium that is flowing through the channel, for example, drinking water or wastewater, is irradiated with UV light and can be disinfected in this way.

BRIEF DESCRIPTION OF THE DRAWINGS

Further advantages and advantageous embodiments of the invention can be taken from the following drawing, its description, and the claims.

DRAWING

It is shown in

Figure 1:
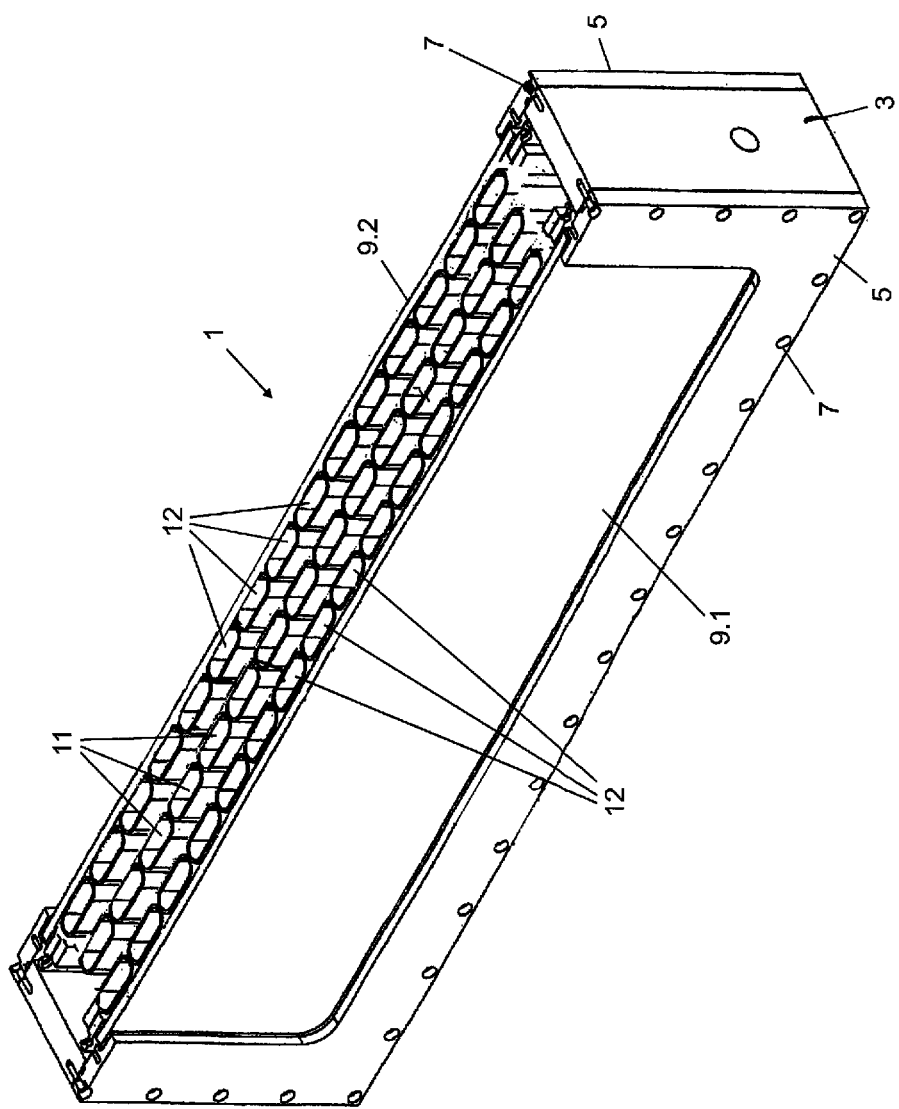
Figure 2:
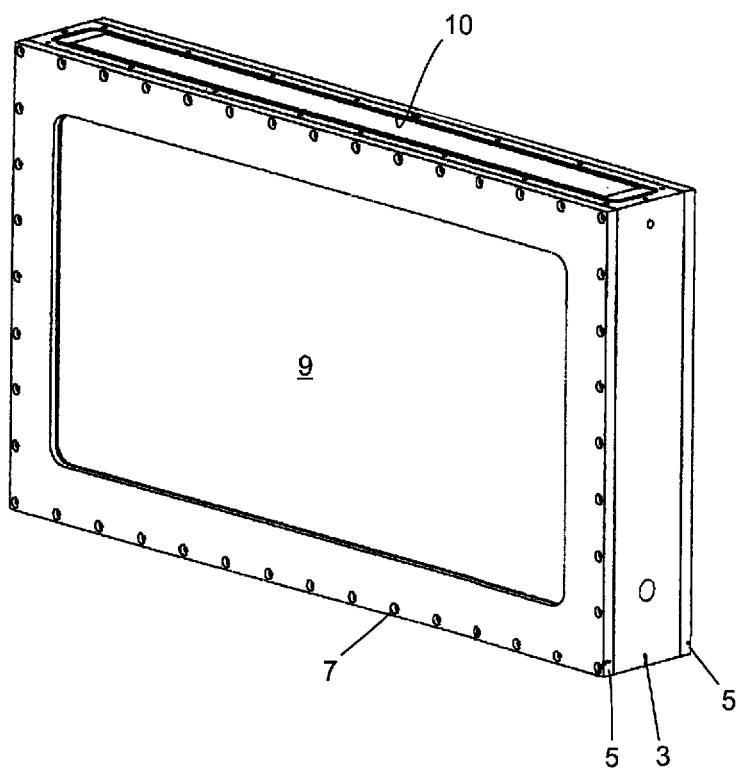
Figure 3:
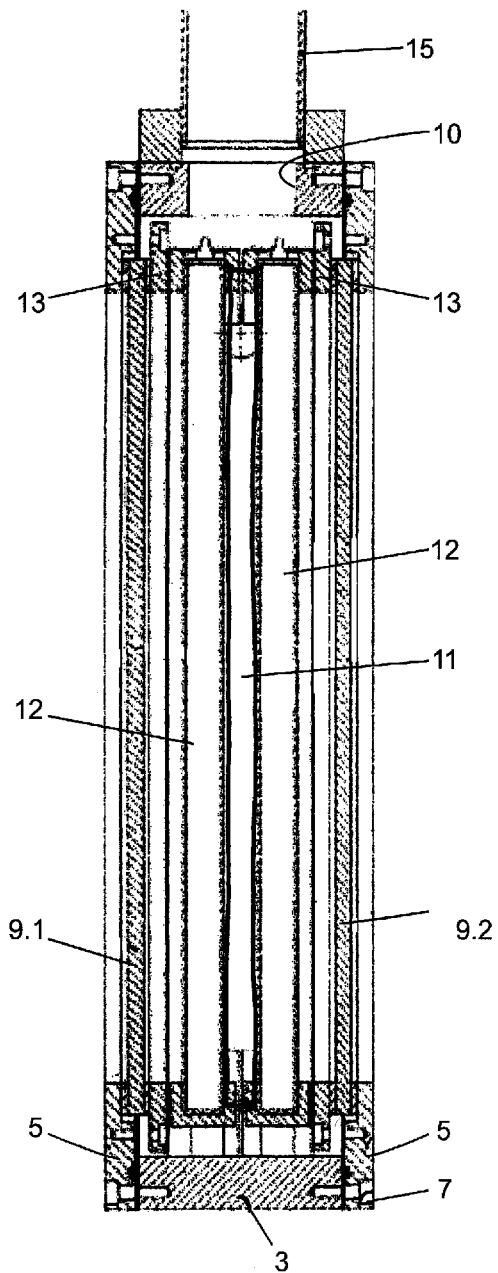
Figure 4:
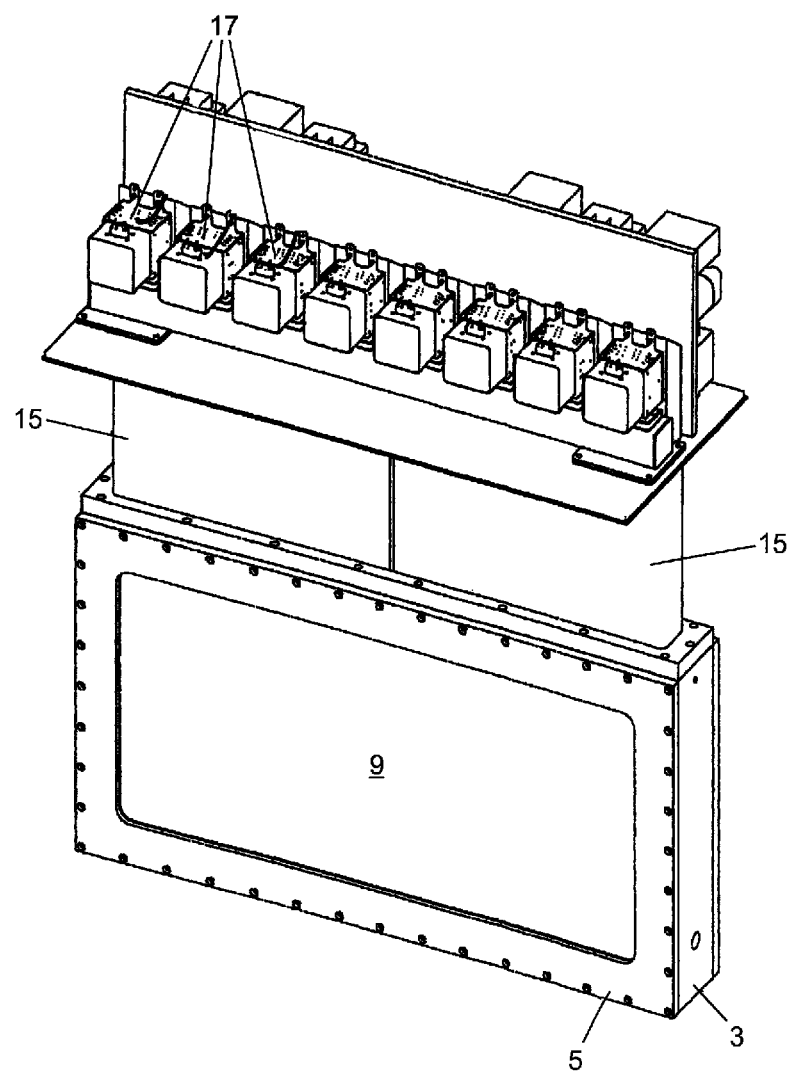

FIG. 1: an isometric illustration of a chamber according to the invention, partially in section view;

FIG. 2: an isometric illustration of a chamber according to the invention;

FIG. 3: a cross-section of a chamber according to the invention;

FIG. 4: an isometric illustration of a device according to the invention with chamber, waveguide, and several magnetrons.

Figure 5:
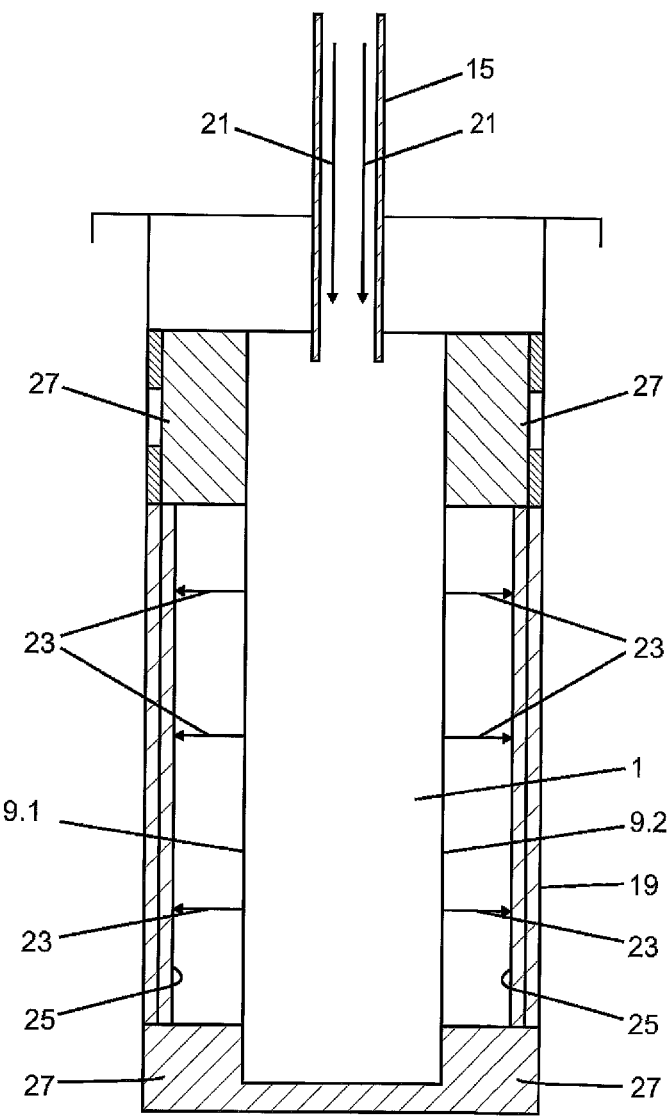

FIG. 5: a cross-section of a mounting situation, and

Figure 6:
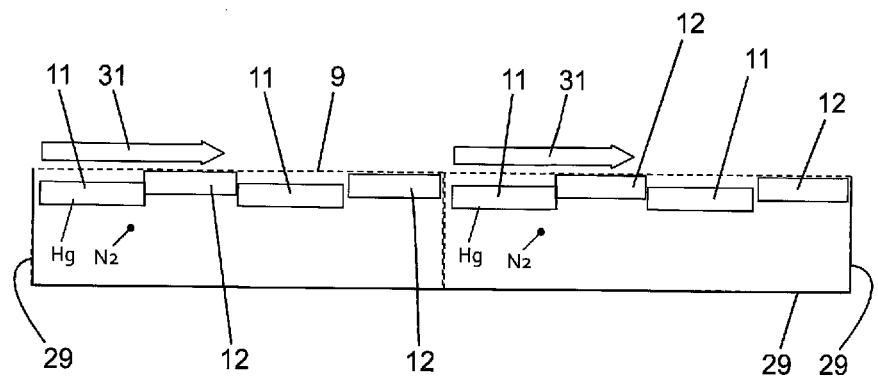
Figure 7:
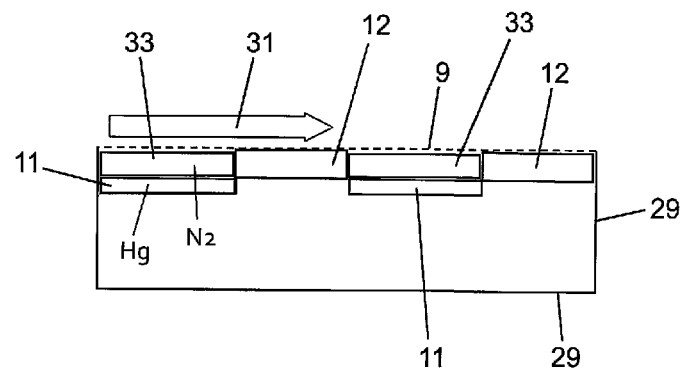
Figure 8:
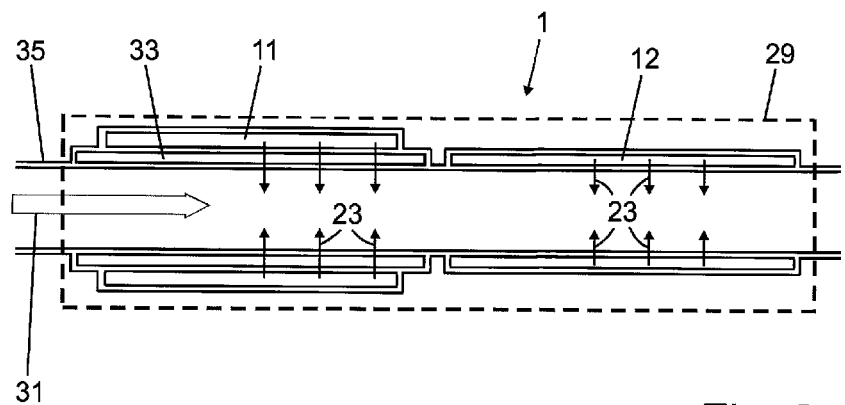
Figure 9:
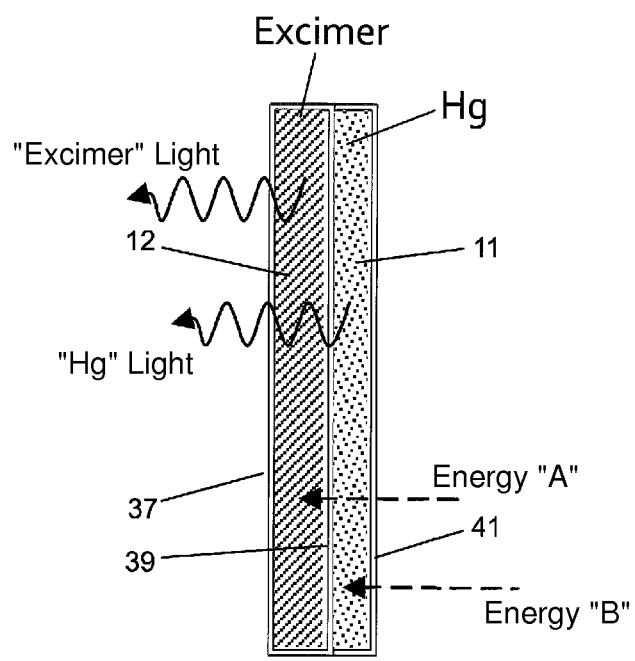
Figure 10:
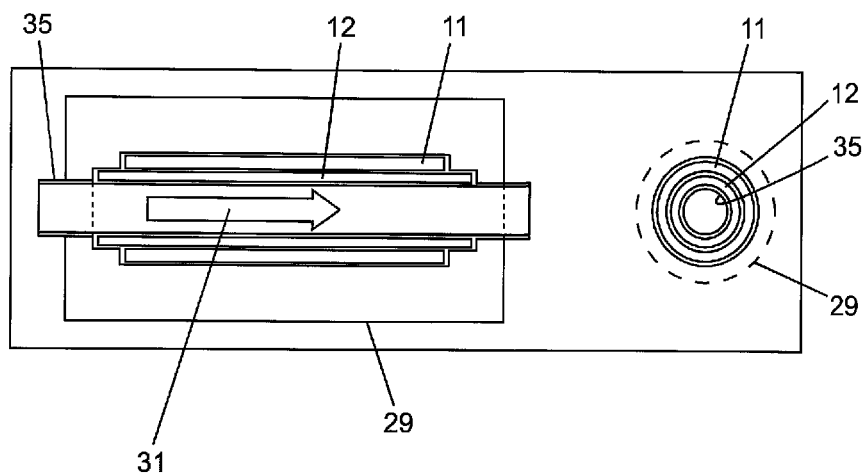
Figure 11:
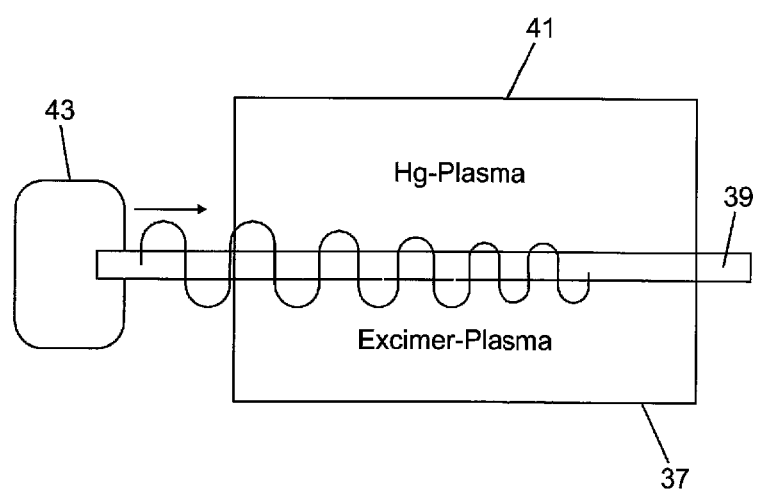
Figure 12:
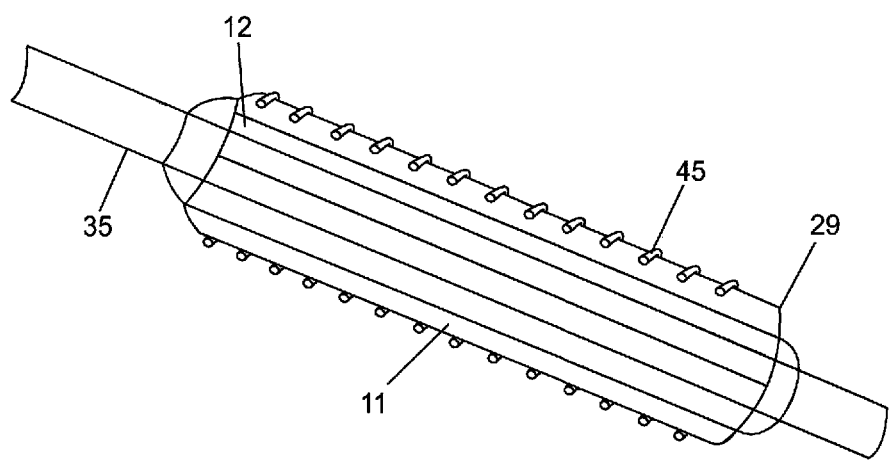
Figure 13:
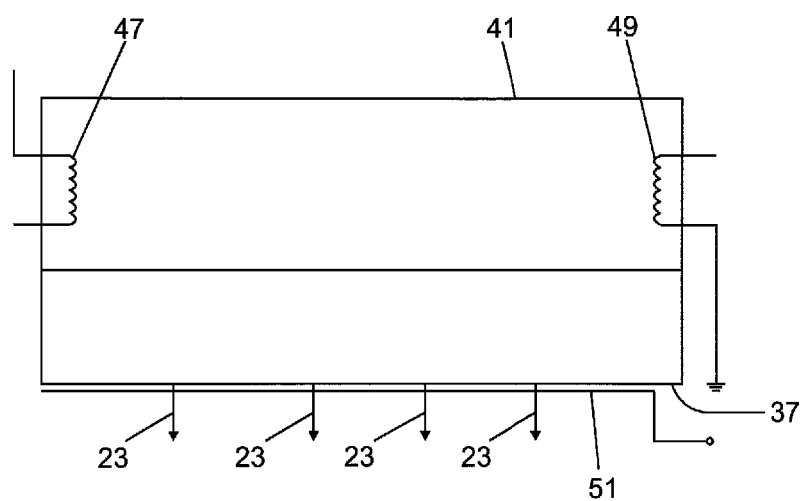

FIG. 6 shows an embodiment with one plate;

FIG. 7 shows an embodiment with a further chamber between plate and plasma chambers;

FIG. 8 shows an embodiment with glass tube;

FIG. 9 shows a different embodiments according to the invention with plasma chambers having a common wall;

FIG. 10 shows a cylindrical configuration;

FIGS. 11 to 13 illustrate alternative possibilities for injecting energy.

DESCRIPTION OF PREFERRED EMBODIMENTS

A description of the Embodiments follows.

In FIG. 1, a device 1 of an embodiment of a device according to the invention is illustrated in an isometric section view.

The device 1 is comprised of a circumferential frame 3. At a front side of the frame 3, a cover 5 is screwed on. The screw holes of this screw connection are identified with reference characters 7. The cover 5 serves for receiving a plate 9. This plate 9 is made of a material which is transparent for UV light and/or VUV light. On the plate 9, a grid (not illustrated) can be applied which is impermeable to microwave radiation but allows passage of UV light. By retaining the microwaves, the efficiency is increased and a closed cage according to Faraday is formed.

In the interior of the device 1, a row of plasma chambers 11 and two rows of plasma chambers 12 are arranged. The plasma chambers 11 form a first group and the plasma chambers 12 from a second group.

The plasma chambers 11 are arranged at a considerable spacing relative to the plates 9.1 or 9.2.

In this way, heat transmission from the plates 9 onto the first group of plasma chambers 11 is significantly reduced or even completely inhibited.

This is advantageous because the plasma chambers 11 of the first group are filled with a mercury-containing gas or gas mixture which emits more UV light with increasing operating temperature. Therefore, cooling of this first group of plasma chambers 11 by the drinking water or wastewater to be disinfected, which flows across the plates 9, is undesirable. By the way, the plasma chambers 12 of the second group also constitute thermal insulation between the plasma chambers 11 and the plates 9.1 or 9.2.

On the back side of the frame 3, there is also a cover 5 and a plate 9. The configuration corresponds to the front side so that a detailed description is omitted here.

In FIG. 2, the device 1 is not illustrated in section. Same components have the same reference characters and what has been disclosed in regard to FIG. 1 applies here as well. In the frame 3, one or several openings 10 are provided through which the microwave radiation can be injected into the interior of the chamber 1.

Through the opening 10 at the top side of the chamber 1, microwave radiations reach the interior of the chamber 1. Here the microwaves excite the gas or gas mixture contained in the plasma chambers 11 and 12 for emission of UV light and/or VUV light. By selecting the gas and the pressure which is present in the interior of the plasma chambers 11, the wavelength of the light emitted by the plasma chambers 11 can be adjusted in wide ranges. In the plasma chambers 11 and 12 of the first group and those of the second group, an excitation of the gases or gas mixture is taking place, respectively. Both lead to emission of UV light, however at different wavelengths.

In FIG. 3, a cross-section through a device according to the invention is illustrated. As can be seen in FIG. 3, the plate 9 is attached to the cover 5 by means of a clamping strip 13. The clamping strip 13 is screwed to the cover 5 (not illustrated) so that the plate 9 is clamped between the clamping strip 13 and the cover 5.

As needed, a seal, for example, made of silicone, can be provided between plate 9, cover 5 as well as cover 5 and frame 3. A waveguide 15 is placed onto the opening 10 in the frame 3.

The waveguide 15 serves to guide the microwaves emitted by one or several magnetrons 17 through the opening 10 into the interior of the chamber 1. In many applications of the device according to the invention, the magnetron or magnetrons 17 can be placed directly onto the frame 3. The waveguide 15 is then not needed.

In FIG. 4, an isometric illustration of a device according to the invention comprised substantially of the chamber 1, waveguides 15, and magnetrons 17 is illustrated.

By the use of one or several magnetrons 17, microwaves are injected into the chamber 1 across the entire length of the chamber 1 so that all plasma chambers 11 and 12 are excited with about the same intensity of microwaves. Further advantages of using several magnetrons 17 are the usability of inexpensive standard magnetrons and the fail-safe operation because of multiple redundancies.

By the reflection of the microwaves in the interior of the device 1, the plasma chambers 11 and 12 are excited are almost with the same intensity to luminesce or emit UV light. Therefore, reflectors or other devices for guiding microwaves within the chamber 1 are also not needed. In any case, it is advantageous when the inner walls of the chamber 1 are comprised of a material and/or comprise a grid which reflects microwaves or is provided with an appropriate coating that reflects microwaves.

In FIG. 5, a device 1 according to the invention is illustrated which is mounted in a wastewater channel and serves for disinfection of the water which is flowing through the wastewater channel.

The channel is identified in FIG. 5 by reference character 19. The entire channel cross-section is filled with water (not illustrated).

The device 1 is arranged in such a way in the channel 19 that the longitudinal direction of the device 1 is extending parallel to the flow direction of the water within the channel 19. In the cross-section according to FIG. 5, the water flows perpendicular to the drawing plane through the channel 19. The microwaves generated by the magnetrons 17 pass through the waveguide 15 into the interior of the device 1. These microwaves are indicated in FIG. 5 by arrows 21. In the interior of the device 1, the microwaves impinge on the plasma chambers 11 and 12 and excite the gas or gas mixture contained in the plasma chambers so that this gas emits UV light or vacuum UV light (excimer radiator).

This emitted UV light is indicated in FIG. 5 by arrows 23. This light of different wavelengths has particularly good disinfection properties. As a result of this, the water contained in the channel 19 is effectively and lastingly disinfected by the UV light emitted by the plasma chambers 11 and 12.

On the sidewalls of the channel 19, a UV-light reflecting coating 25 can be provided. In this way, it is ensured that UV light which has reached the sidewalls of the channel 19 is not absorbed by the sidewalls but is reflected by the coating 25 and can serve again for disinfection of water. In this way, the efficiency of the device according to the invention is improved in a simple way.

In order to ensure that the entire water that is flowing through the channel 19 is disinfected, in the channel 19 guiding bodies 27 are provided. These guiding bodies 27 narrow in the area of the light source 1 the free flow cross-section to a size that is matched to the dimensions of the plate 9.

As a result of this, the entire water contained in the channel 19 passes the plate 9 and reaches the radiation area of the UV light source according to the invention which is indicated by arrows 23.

In FIG. 6, a section of a further embodiment of a device 1 according to the invention is illustrated.

In this embodiment, only one plate 9 is present. The other sides and walls 29 of the device 1 are comprised of a material which is impermeable for UV light, for example, stainless steel. In this illustration, it can be seen well that the first group of plasma chambers 11 is arranged at a spacing to the plate 9 so that no thermal conduction between the glass plate 9 and the plasma chambers 11 is taking place. The interior of the device 1 is filled with nitrogen $N_2$. This inert gas has excellent thermal insulation properties so that the nitrogen $N_2$ contained between the plate 9 and the plasma chambers 11 further improves the thermal insulation.

The second group of plasma chambers 12 in which excimers are formed by excitation of the gas or gas mixture contained therein, are in contrast thereto in direct contact with the plate 9 so that the plate 9 cools, or the water that is flowing therebehind across the plate 9 (not illustrated) first cools the plate 9 and thereby indirectly also the plasma chambers 12. In this way, the efficiency of UV light generation in the plasma chambers 12 is increased.

The flow direction of the water to be disinfected (not illustrated) is indicated by arrows 31. In this serial arrangement of plasma chambers 11, in which ionization is taking place, and plasma chambers 12, in which formation of excimers is taking place, the microbes in the water are alternatingly loaded by UV light of different wavelengths so that they are efficiently and lastingly destroyed and the water is thus disinfected.

In the embodiment according to FIG. 7, between the plasma chambers 11 of the first group and the plate 9 a further chamber 33 is arranged in which nitrogen $N_2$ or vacuum is present. This chamber 33 serves as thermal insulation and is arranged between the plate 9 and the plasma chamber 11.

The embodiments illustrated in FIGS. 1 to 7 are designed such that the plate 9 is formed as a flat surface. It is, of course, also possible to design the plate 9 as a tube and to have the water to be disinfected or the liquid to be disinfected flow in the interior of this glass tube. Such embodiments are illustrated in FIGS. 8, 9, and 11. The function is comparable to the afore described embodiments. Only the geometry and the concentric arrangement about the glass tube 35 is different.

In FIG. 8, a first embodiment of a tubular device 1 is illustrated. In the interior of this device 1, a glass tube 35 is arranged through which the water to be disinfected flows.

The device 1 is surrounded by outer walls 29. In the interior of the device 1, an annular chamber 33 which is filled with nitrogen or in which vacuum is present is provided as thermal insulation. Concentrically to the chamber or chambers 33, a plasma chamber 11 that is also of an annular configuration and that is filled with a mercury-containing gas or gas mixture is arranged.

Downstream of the plasma chamber 11, a further annular plasma chamber 12 is arranged in which a gas is provided that forms excimers when excited appropriately. This means that the plasma chambers 11 and 12 emit UV light through the glass tube 35 in radial inward direction into the water to be disinfected so that microbes contained therein are destroyed. In order to increase the efficiency of the device 1, either the walls 29 can be made reflective for UV radiation or a reflective coating is applied onto the cylindrical outer wall of the plasma chambers 11 and 12.

In FIG. 9, an embodiment of plasma chambers 11 and 12 is illustrated in which the plasma chambers 11 and 12 have a common wall. This is thus a structure with substantially three walls 37, 39 and 41 arranged parallel to each other.

At least the walls 37 and 39 are transparent for UV light. When now the gas or the gas mixtures contained in the plasma chambers 11 and 12 are excited appropriately, UV light at a wavelength of approximately 254 nm is produced in the plasma chamber 11 as a result of ionization of the mercury-containing gas. In the plasma chamber 12, as a result of excimer formation, a UV light of a shorter wavelength with a wavelength of approximately 200 nm is produced. The plasma chamber 12 serves in this context at the same time as a thermal insulation for the plasma chamber 11. The plate 9 that is not illustrated is thus located to the left of the plasma chamber 12.

Such a configuration can be embodied to be planar, similar to FIGS. 1 through 7, or as a cylindrical configuration, as indicated in FIG. 10.

In FIGS. 11 to 13, further alternative possibilities for injecting energy are illustrated.

The configuration according to FIG. 9 in which the plasma chambers 11 and 12 have a common wall 39 is suitable particularly in order to inject the microwaves by a surface-sustained wave into the plasma chambers 11 and 12. In FIG. 11 such a constellation is illustrated. In this context, the dielectric wall 39 is extended somewhat past the actual chambers 11 and 12 so that a microwave generator 43 can be connected thereto. The electromagnetic radiation which is emitted by this microwave generator 43 propagates as a surface-sustained wave along the wall 39 and reaches thus the plasma chambers 11 and 12. Here, the desired excitation of the gases or gas mixtures in the chambers 11 and 12 takes place.

In FIG. 12, a tubular arrangement is indicated in which the chambers 11 and 12 are excited without electrodes by induction, in particular by inductive coupling. The induction coil required for this is identified by reference character 45.

In FIG. 13, a further variant of the plasma chambers 11 and 12 is illustrated. The plasma chamber 11 is excited by heated electrodes 45 that, for example, are supplied with an alternating current at 50 Hz. This excitation is very common, functions best, and is very fail-safe.

The electrode 49 in this embodiment has a dual function because it is also utilized in connection with the dielectric barrier discharge excitation of the plasma chamber 12. Parallel to the wall 37, a DBD electrode 41 is arranged. Between the electrode 49 and the DBD electrode 51, a high-frequency voltage at a frequency of several kHz up to, for example, 100 kHz is applied and leads thus to the desired excimer formation in the plasma chamber 12.

So that the UV light 23 can pass through the wall 37 and the DBD electrode into the wastewater to be disinfected, the DBD electrode is, for example, formed as a grid or net structure so that the UV light 23 can be emitted through the DBD electrode 51. These types of excitation, be it by means of a magnetron 17, a microwave generator 43, an induction coil 45, as well as electrodes 47, 49, and 51, can be appropriately used in all of the embodiments, of course. In all cases, the advantages according to the invention are obtained.

What is claimed is:

1. A device for producing UV light and/or vacuum UV light, the device comprising:
    a UV-transparent chamber comprising at least one area transparent for UV light and/or vacuum UV light;
    a first group of plasma chambers filled with a mercury-containing ionizable gas;
    a second group of plasma chambers filled with a gas that forms excimers upon suitable excitation;
    wherein a plasma chamber of the second group and a plasma chamber of the first group are directly joined by a common wall, wherein said plasma chamber of the second group is positioned with a wall opposite the common wall next to the at least one area transparent for UV light and/or vacuum UV light;
    wherein said plasma chamber of the second group forms a thermal insulation for said plasma chamber of the first group.

2. The device according to claim 1, wherein the plasma chambers of the first group emit a first UV light at a wavelength of 254 nm and the plasma chambers of the second group emit a second UV light at a wavelength of less than 250 nm.

3. The device according to claim 2, wherein the second UV light has a wave length of less than 220 nm.

4. The device according to claim 1, wherein the plasma chambers of the second group are configured to be excited by a dielectric barrier discharge (DBD); capacitive discharge; inductive coupling (ICP); and/or microwaves.

5. The device according to claim 1, wherein the UV-transparent chamber comprises at least one plate that is transparent for UV light and/or vacuum UV light, wherein a thermal insulation that is transparent for UV light and/or vacuum UV light is arranged between the plasma chambers of the first group and the at least one plate.

6. The device according to claim 5, wherein the plasma chambers of the first group include plasma chambers arranged in a first row parallel to the at least one plate.

7. The device according to claim 6, wherein the plasma chambers of the first group include plasma chambers arranged in a second row parallel to a second one of the at least one plate.

8. The device according to claim 1, wherein the plasma chambers of the first group are filled with mercury vapor and noble gases.

9. The device according to claim 1, wherein the plasma chambers of the second group are filled with halogens or noble gases or mixtures thereof or chemical compounds thereof.

10. The device according to claim 1, wherein the plasma chambers of the first group include at least one plasma chamber filled with a mercury-containing gas and wherein the plasma chambers of the second group include at least one excimer radiator.

11. The device according to claim 1, wherein a pressure between $10^{-2}$ mbar and 10 bar exists in the plasma chambers of the first group and in the plasma chambers of the second group.

12. The device according to claim 1, wherein the plasma chambers of the first group and the plasma chambers of the second group are arranged within the UV-transparent chamber.

13. The device according to claim 1, wherein the plasma chambers of the first group are configured to be excited by electrodes with a frequency of excitation in a range between approximately 50 Hz up to $10^5$ kHz; by inductive coupling (ICP); and/or by microwaves.

14. The device according to claim 13, wherein the microwaves are injected as a surface-sustained wave into the plasma chambers of the first group.

15. The device according to claim 13, further comprising at least one magnetron configured to generate the microwaves and wherein the at least one magnetron is arranged outside or inside the UV-transparent chamber.

16. The device according to claim 13, wherein the UV-transparent chamber comprises at least one opening and the microwaves pass through the at least one opening into the UV-transparent chamber.

17. The device according to claim 13, wherein the UV-transparent chamber comprises at least one opening and the microwaves generated by the at least one magnetron are injected through the at least one opening into the UV-transparent chamber.

18. The device according to claim 13, wherein, outside of the UV-transparent chamber, electrodes for inductive coupling (ICP); a dielectric barrier discharge (DBD); and/or a capacitive discharge are provided.

19. The device according to claim 18, wherein the microwaves are injected as a surface-sustained wave into the plasma chambers of the second group.

20. The device according to claim 18, further comprising at least one magnetron configured to generate the microwaves and wherein the at least one magnetron is arranged outside or inside the UV-transparent chamber.

21. The device according to claim 18, wherein the UV-transparent chamber comprises at least one opening through which the microwaves pass into the UV-transparent chamber.

22. The device according to claim 21, wherein the UV-transparent chamber comprises at least one opening and through the at least one opening the microwaves generated by the at least one magnetron are injected into the UV-transparent chamber.

23. The device according to claim 18, wherein, outside of the UV-transparent chamber, electrodes for inductive coupling (ICP); a dielectric barrier discharge (DBD); and/or a capacitive discharge are provided.

* * * * *